United States Patent
Konishi et al.

[11] Patent Number: 5,806,470
[45] Date of Patent: Sep. 15, 1998

[54] VAPORIZER FOR LOW TEMPERATURE LIQUID

[75] Inventors: Keizo Konishi; Ichiroh Sakuraba; Koichi Hayashi; Koichi Shinkai; Katsufumi Tanaka, all of Takasago; Yoshinori Hisazumi, Osaka; Masanori Takata, Osaka; Masanori Oki, Osaka, all of Japan

[73] Assignees: Kabushiki Kaisha Kobe Seiko Sho, Kobe; Osaka Gas Kabushiki Kaisha, Osaka, both of Japan

[21] Appl. No.: 612,841
[22] PCT Filed: Jul. 17, 1995
[86] PCT No.: PCT/JP95/01420
  § 371 Date: May 24, 1996
  § 102(e) Date: May 24, 1996
[87] PCT Pub. No.: WO96/02803
  PCT Pub. Date: Feb. 1, 1996

[30] Foreign Application Priority Data

Jul. 20, 1994 [JP] Japan .................. 6-168028

[51] Int. Cl.$^6$ .............. F22B 23/06; F22B 37/10
[52] U.S. Cl. ................ 122/367.1; 122/367.3; 165/175
[58] Field of Search ............ 122/367.1, 367.2, 122/367.3; 165/175, 176

[56] References Cited

U.S. PATENT DOCUMENTS 3,133,528  5/1964  Litwinoff .
5,341,769  8/1994  Ueno et al. ............... 122/367.3

FOREIGN PATENT DOCUMENTS 0 450 906 A1  10/1991  European Pat. Off. .
0 550 845 A1  7/1993   European Pat. Off. .
0 604 982 A1  7/1994   European Pat. Off. .

OTHER PUBLICATIONS

JP 6–48146, B2, Jun. 22, 1994.
JP 6–221499, Aug. 9, 1994.

*Primary Examiner*—Henry A. Bennett
*Assistant Examiner*—Jiping Lu
*Attorney, Agent, or Firm*—Oblon, Spivak, McClelland, Maier & Neustadt, P.C.

[57] ABSTRACT

A lower header 10 into which low temperature liquid is flowed and an upper header 16 are connected with each other via a plurality of outer heat exchange tubes 22. A plurality of inner heat exchange tube 24 are respectively provided in the corresponding outer heat exchange tubes 22 at a region of an inflow end portion of each outer heat exchange tube 22. An annular passage 23 is defined between an inside surface of each outer heat exchange tube 22 and an outside surface of each inner heat exchange tube 24 for flowing low temperature liquid. Each annular passage 23 is communicated with the lower header 10.

8 Claims, 21 Drawing Sheets

VAPORIZER FOR LOW TEMPERATURE LIQUID

BACKGROUND ART

This invention relates to an open rack type vaporizer for vaporizing low temperature liquid such as liquefied natural gas, liquefied nitrogen.

Conventionally, vaporizers of open rack type have been known as a vaporizer for vaporizing such low temperature liquid. The open rack type vaporizer generally includes a lower header in which low temperature liquid is flowed, an upper header arranged in parallel with the lower header, and a great number of vertical heat exchange tubes connecting the lower and upper headers. Outside of the heat exchange tubes is flowed heating medium such as seawater so that the liquid flowing in the lower header is heated and vaporized by heat of the heating medium in each heat exchange tube. Thus obtained natural gas is recovered by the way of the upper header.

In this arrangement, the lower header and a lower portion of the heat exchange tube come into direct contact with the lower temperature liquid. Consequently, the temperature of these portions is very low. The formation of ice is liable to occur on an outside surface of these portions. The ice becomes a heat insulation barrier, and hinders the heat exchange at the lower portion of the heat exchange tube, thereby lowering the temperature of these portions further and resulting in an exceedingly low temperature condition. In the state that the lower portion of the heat exchange tube is cooled to an exceedingly low temperature, the contraction rate of the heat exchange tube becomes large. Accordingly, there is a likelihood that a slight deviation in the flow of seawater causes a great contraction difference among heat exchange tubes, and finally results in local deformations in heat exchange tubes.

Japanese Unexamined Patent Publication No. 4-217788 discloses provision of a heat insulator on a portion of a heat exchange tube except an outflow portion near an upper header to suppress heat transfer between the heat exchange tube and natural gas flowing inside the heat exchange tube. The heat insulator is formed by providing a cylindrical insulating member on an inner surface of a heat exchange tube, or by forming an insulating space in a heat exchange tube in which vaporized natural gas is contained. The heat insulator prevents an outside surface of the heat exchange tube from being cooled to a terribly low temperature, thereby preventing a large contraction. It is certain that the heat insulator hinders the heat exchange between low temperature liquid and heating medium. However, the vaporization efficiency of the heat exchange tube provided with the heat insulator may be substantially identical to that of the heat exchange tube which is not provided with the heat insulator but is likely to be formed with heat insulating ice on an outside thereof.

However, the heat insulator disclosed in the above publication provides a very low heat transfer rate. Accordingly, it is required to set the thickness of the heat insulator at a very small value. A slight difference in the thickness of the heat insulator causes a great difference in the heat transfer of the heat exchange tube. Specifically, if having a thickness slightly greater than a specified thickness, the heat insulator exceedingly insulates heat, resulting in an insufficient heat transfer between an outside and an inside of the heat exchange tube, consequently making it difficult to sufficiently heat and vaporize the low temperature liquid. Conversely, if having a thickness slightly smaller than a specified thickness, the heat insulator cannot insulate heat sufficiently, consequently resulting in ice formation as the conventional heat exchange tubes. For example, FIG. 25 shows a relationship between the thickness of the heat insulator (i.e., a radial size of an insulating space) and the thickness of ice providing a heat transfer rate equivalent to the heat insulator in the case where the heat insulator is formed by drawing natural gas in the insulating space as mentioned above. It will be seen in FIG. 25 that a variation of 0.1 mm in the radial size is equal to a change of 10 mm in the thickness of ice in the aspect of heat insulation. The heat insulator formed by providing the insulating member made of vinyl chloride or the like inside the heat exchange tube has a similar heat insulation relationship. In other words, a small variation in the thickness of the insulating member will cause a great change in the heat insulation.

For this reason, in this vaporizer, it is necessary to manage the thickness of the heat insulator to high preciseness. In production lines, however, it is very difficult to accomplish such high preciseness. Even if such high preciseness can be accomplished, its production costs will become very high. Further, even if the heat insulator having the thickness of high preciseness can be made in the production line, its thickness will be liable to greatly change due to thermal deformation in the use.

Alternatively, it is possible to expand the dimensional variation tolerance by using a heat insulator made of material having relatively high heat transfer rate, e.g., metal, which has an increased thickness. In this case, however, there is a problem that such heat insulator is liable to corrode and change the quality of vaporized product as.

In view of these problems, the present invention has an object of providing a low temperature liquid vaporizer which can reliably prevent ice formation and ensure sufficient heat transfer even if a variation exists in the insulating thickness.

DISCLOSURE OF THE INVENTION

To solve the above problems, a low temperature liquid vaporizer of the present invention has adopted the following arrangement.

Specifically, the present invention is directed to a low temperature liquid vaporizer comprising: an inflow header for flowing low temperature liquid; a plurality of outer heat exchange tubes communicated with the inflow header, each outer heat exchange tube extending in a direction perpendicular to the inflow header, an outside of the outer heat exchange tube coming into contact with a heating medium; an outflow header communicated with the inflow header by way of the plurality of outer heat exchange tubes for flowing gas produced by vaporization of the low temperature liquid in the outer heat exchange tubes; a plurality of inner heat exchange tubes provided in at least respective inflow portions of the plurality of outer heat exchange tubes, each inner heat exchange tube forming an annular passage between an inside surface of the corresponding outer heat exchange tube and an outside surface of the inner heat exchange tube, the annular passage communicating with the inflow header for flowing the low temperature liquid.

With this vaporizer, low temperature liquid is flowed from the inflow header into not only the inside of the inner heat exchange tube but also the annular passage between the outer and inner heat exchange tubes. In the annular passage, the low temperature liquid in the vicinity of an inside surface of the outer heat exchange tube of a relatively high temperature is vaporized by an active heat exchange with a heating medium which is flowed over an outside surface of the outer heat exchange tube. On the other hand, the low temperature liquid in the vicinity of an outside surface of the inner heat exchange tube of a relatively low temperature flows up in the state of liquid phase. In this state, there is a great forced convection boiling in the annular passage owing to the fact of the flow of fluid in an axial direction of the outer and inner heat exchange tubes and the co-existing of the liquid and gaseous phases. Accordingly, the heat transfer rate of the annular passage increases. In other words, comparing to the conventional heat insulator merely containing gaseous material in a space between two tubes, the annular passage has an increased heat transfer rate. Accordingly, the space distance of the annular passage can be increased. This will make it possible not only to prevent ice formation on the outside surface of the outer heat exchange tube but also to ensure sufficient heat transfer even if the space distance is slightly larger or smaller than a specified value.

More specifically, it may be appreciated that either of the inside surface of the outer heat exchange tube and the outside surface of the inner heat exchange tube is formed with a plurality of projections projecting toward the other surface, a lead end of each projection coming into contact with the other surface. This construction will stably hold the outer and inner heat exchange tubes in a coaxial arrangement, and prevent deformation of the outer and inner heat exchange tubes, and assure efficient vaporization, and further prevent the inner heat exchange tube from vibrating.

In the case that the inside surface of the outer heat exchange tube is formed with the projections, the projections increase the inside surface area of the outer heat exchange tube, and thus enhance the heat transfer rate of the outer heat exchange tube with respect to the low temperature liquid in the annular passage.

The inner heat exchange tube may be made to be shorter than the outer heat exchange tube, and the inner heat exchange tube may be disposed in an inflow end portion of the outer heat exchange tube. In this construction, vaporized fluid can be sufficiently heated in the region of the outer heat exchange tube where the inner heat exchange tube is not provided, (i.e., an outflow portion of the outer heat exchange tube).

The inner heat exchange tube may be formed with an ejection hole in a wall thereof and provided with a closing member in the inner heat exchange tube at a position closer to the outflow header than the ejection hole. In this construction, the low temperature liquid supplied into the inner heat exchange tube is ejected in the annular passage through the ejection hole, and is mixed with vaporized low temperature liquid in the annular passage. Accordingly, the vaporization of low temperature liquid is accelerated. Also, a heat transfer coefficient of a film of gas spreading over an inside surface of the inner heat exchange tube is increased, and the heat transfer is enhanced.

It may be appreciated that the outer and inner heat exchange tubes are arranged in a vertical direction while the outflow header is above the inflow header, and an outflow end of the inner heat exchange tube is fixedly attached to the outflow header. The outer and inner heat exchange tubes are supported in a suspended state by the outflow header. Accordingly, respective lower end portions of the outer and inner heat exchange tubes are not fixedly held. This will prevent the outer and inner heat exchange tubes from receiving a great thermal stress due to thermal contraction.

Further, in the above-mentioned vaporizers, if low temperature liquid is directly mixed with a heat adjusting fluid, impurity matters having a high solidifying temperature, e.g., methanol, contained in the heat adjusting fluid are liable to be separated or solidified and then close a passage. In view of the fact, it may be appreciated to provide a secondary header for flowing heat adjusting fluid, to use an inner heat exchange tube whose outflow end projects from an outflow end of the outer heat exchange tube and is connected with the secondary header, and to form a mixing hole in a wall of the inner heat exchange tube at a position which is closer to its outflow end than the closing member and not beyond the outflow end of the outer heat exchange tube. In this construction, heat adjusting fluid is supplied from the secondary header, and is flowed into the inner heat exchange tube, and is ejected through the mixing hole into the annular passage between the inner and outer heat exchange tubes, so that impurity matters having a high solidifying temperature is prevented from separating and solidifying. In this way, the low temperature liquid and the heat adjusting fluid are mixed in a good state, and an accurate heat amount adjustment is thus attainable.

It may be appreciated that an inflow end of the inner heat exchange tube is positioned in the inflow header. The low temperature liquid flowing in the inflow header is assuredly introduced into the inner heat exchange tube. Accordingly, this construction will eliminate the likelihood that when the load of low temperature liquid flowing in the inflow header is small (i.e., the flow rate is small), heavy components of the low temperature liquid remain and deposit in the inflow header in a higher density.

BEST MODE FOR CARRYING OUT THE INVENTION

A first embodiment according to this invention will be described with reference to FIGS. 1 to 5. It should be noted that although the following embodiments will be described as a vaporizer for vaporizing liquefied natural gas (hereinafter referred to as "LNG"), this invention is applicable for vaporizing various low temperature liquids such as liquefied nitrogen.

Figure 3:
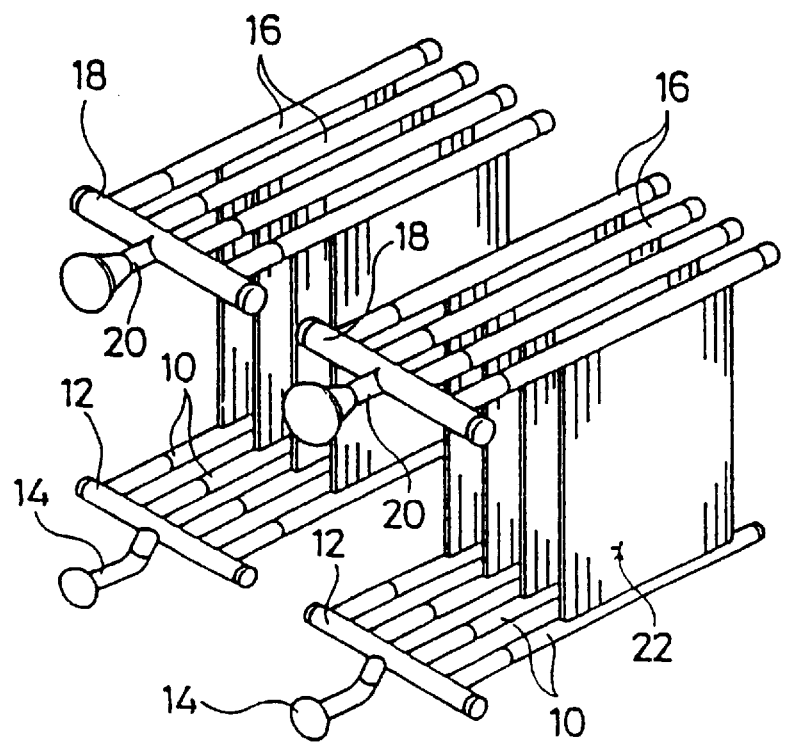
FIG. 3 is a perspective view showing an overall construction of the vaporizer.

As shown in FIG. 3, the vaporizer includes a plurality of lower headers (or inflow headers) 10 extending in parallel with a horizontal direction. A specified number of lower headers 10 are connected with a manifold 12, and LNG is supplied to the lower headers 10 via an LNG supply pipe 14 and the manifold 12. Further, the vaporizer includes a plurality of upper headers 16 arranged above the plurality of lower headers 10 in parallel with them. A specified number of upper headers 16 are connected with manifolds 18 and 20.

Figure 1:
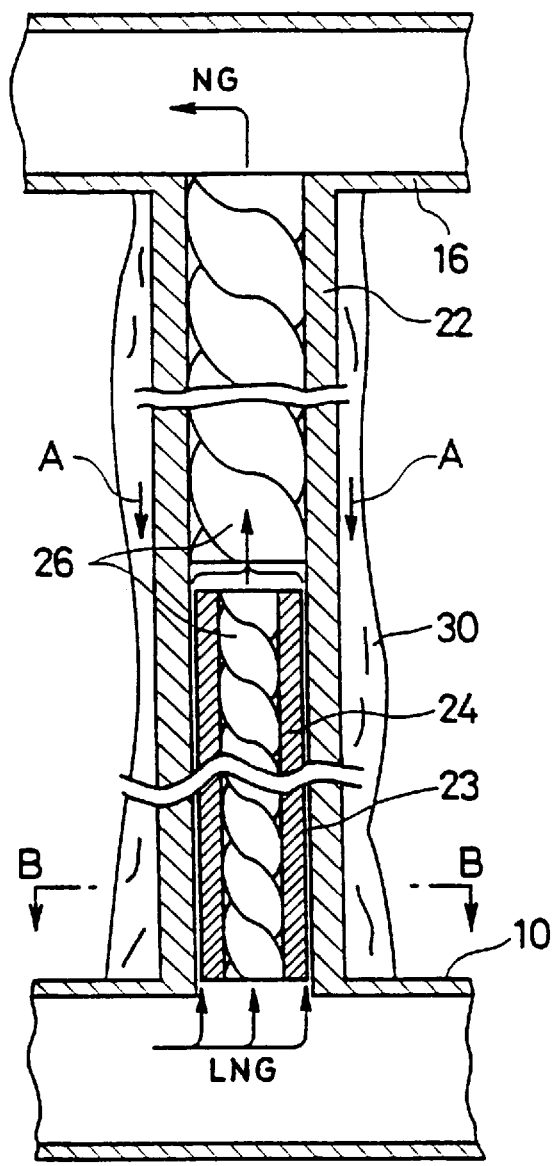
FIG. 1 is a front view in cross section showing an essential part of a liquefied natural gas vaporizer as a first embodiment according to this invention.
Figure 2:
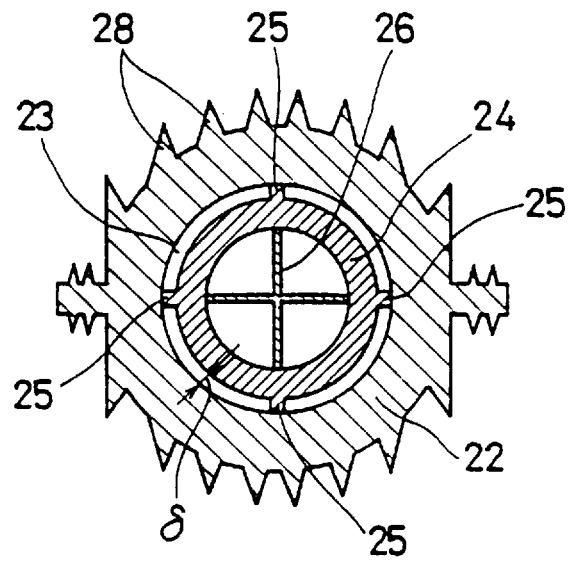
FIG. 2 is a cross sectional view taken along the line B—B in FIG. 1.

Between the lower header 10 and the upper header 16 is provided a heat exchange panel including a number of outer heat exchange tubes 22 vertically extending in parallel with one another. As shown in FIG. 1, each outer heat exchange tube 22 connects an interior of the lower header 10 and that of the upper header 16. Further, an inner heat exchange tube 24 is provided in a lower portion of each outer heat exchange tube 22. The inner heat exchange tube 24 has a smaller diameter than the outer heater exchange tube 22. Between the outer heat exchange tube 22 and the inner heat exchange tube 24 is defined an annular passage 23 which communicates with the interior of the lower header 10. More specifically, as shown in FIG. 2, the inner heat exchange tube 24 is formed with a plurality of ribs or projections 25 on an outside surface thereof. The ribs 25 are arranged in a circumferential direction of the inner heat exchange tube 24. In this embodiment, four ribs 25 are formed. A lead end of the rib 25 comes into contact with an inside surface of the outer heat exchange tube 22, and welded to an inside surface of the outer heat exchange tube 22 at least one portion, e.g., a lower portion, to thereby fixedly connect the inner heat exchange tube 24 to the outer heat exchange tube 22.

It should be appreciated that in this invention, the manner of fixedly connecting the inner heat exchange tube 24 to the outer heat exchange tube 22 is not limited to welding. For example, the inner and outer heat exchange tubes 22 and 24 may be fixedly connected with each other by a mechanical manner of placing the inner heat exchange tube 24 in the outer heat exchange tube 22 and drawing them together with each other.

Further, the outer heat exchange tube 22 is formed with a number of fins 28 on an outside surface thereof to enhance the heat transfer. Heating medium 30 such as seawater is flowed over the outside of the outer heat exchange tube 22 in a downward direction as shown by the arrow A in FIG. 1.

In FIG. 1, indicated at 26 are twisted heat transfer accelerators. These heat transfer accelerators 26 are placed in the inner heat exchange tube 24 and an upper portion of the outer heat exchange tube 22. In this invention, the heat exchange accelerator 26 may be omitted. Alternatively, other heat transfer accelerators may be provided.

An operation of this vaporizer will be described.

LNG supplied in the lower header 10 flows up in the inner heat exchange tube 24 and in the annular passage 23 which is defined between the inner heat exchange tube 24 and the outer heat exchange tube 22. The inflow rate into the inner heat exchange tube 24 and the inflow rate into the annular passage 23 depend on a pressure loss of LNG flowing in the inner heat exchange tube 24 and in the annular passage 23. Their respective flow rates become stable when the pressure at an inflow portion of the inner heat exchange tube 24 equals to that at an inflow portion of the annular passage 23 and that the pressure at an outflow portion of the inner heat exchange tube 24 equals to that at an outflow portion of the annular passage 23. The larger the radial distance $\delta$ of the annular passage 23 (see FIG. 2) becomes, the more the inflow rate into the annular passage 23 becomes.

Figure 5:
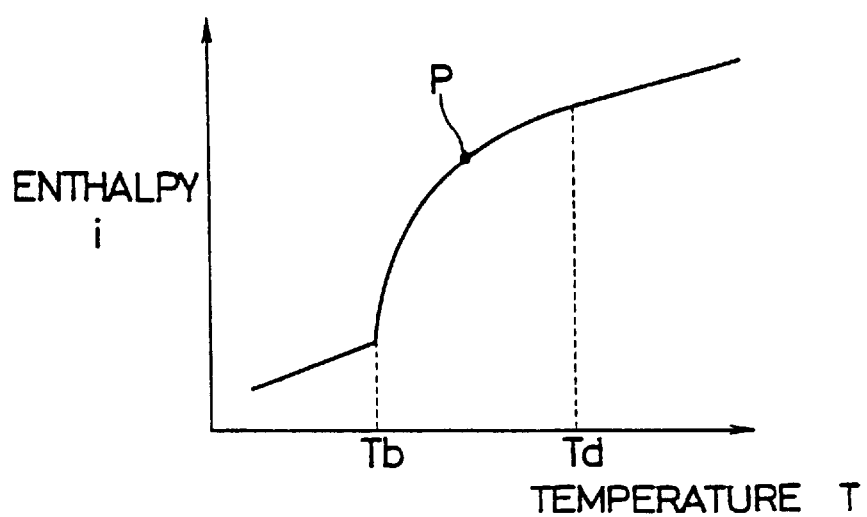
FIG. 5 is a graph showing a relationship between the temperature of liquefied natural gas and specific enthalpy in the annular passage.

Generally, the relationship between the temperature T of LNG and specific enthalpy i can be represented by a graph shown in FIG. 5. Specifically, in a first region where the LNG temperature T is smaller than the boiling point Tb of LNG or the temperature at which LNG transits to the gaseous phrase, i.e., natural gas (hereinafter, referred to as "NG"), there exists only LNG in the form of liquid. In a second region where the LNG temperature T is not smaller than the boiling point Tb but smaller than the dew point Td, there exist LNG in the form of liquid and NG in the form of gas in a mixed state. In a third region where the LNG temperature T is not smaller than the dew point Td, there exists only NG.

Figure 4A:
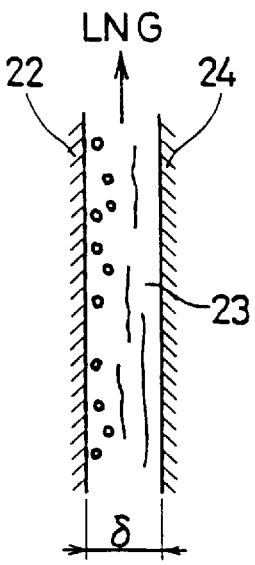
FIGS. 4(a) to 4(c) are diagrams showing a flowing state of liquefied natural gas and natural gas in an annular passage defined in the vaporizer.
Figure 4B:
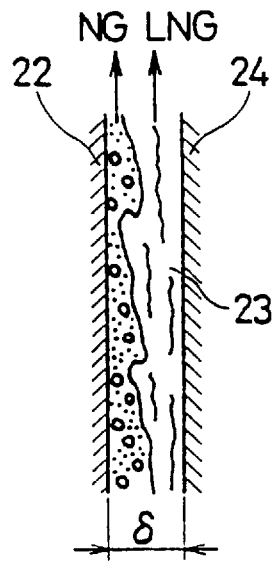

A lower portion of the annular passage 23, i.e., an inflow portion into which LNG is flowed, corresponds to the first region. In this region, only LNG can be theoretically supposed to exist. Actually, as shown in FIG. 4(a), near a wall of the outer heat exchange tube 22, LNG is partially boiled, so that bubbles occur because the LNG is subjected to heat transmitted through the outer heat exchange tube 22. This phenomenon is called "sub-cool boiling". An upper portion of the annular passage 23 corresponds to the second region where the LNG is substantially boiled in the vicinity of the wall of the outer heat exchange tube 22 as shown in FIG. 4(b), consequently producing a mixed state of gas and liquid. In either case, the mixture of gas and liquid and upward streams of LNG and NG promote forced convection boiling, thereby increasing the heat transfer rate. Accordingly, compared to the conventional vaporizer having the heat insulator containing entirely gaseous NG, the annular passage 23 provides a higher heat transfer rate. Accordingly, the space distance $\delta$ of the annular passage 23 (see FIG. 2) can be made larger. This will not need the severe management of the heat insulator thickness which has been required in the conventional vaporizer provided with the heat insulator having the heat insulating member attached on the inside surface of the heat exchange tube or being formed with a gaseous layer containing NG. In this construction, even if the space distance $\delta$ of the annular passage 23 is erroneously beyond a specified value, LNG can be sufficiently heated and vaporized without forming ice on the lower portion of the outer heat exchange tube 22 because the high heat transfer rate is assured.

If the inner heat exchange tube 24 is too short compared to the outer heat exchange tube 22, ice is liable to be formed in the vicinity of an upper end portion of the inner heat exchange tube 24 (i.e., at an intermediate portion of the outer heat exchange tube 22), because LNG which is in the process of vaporization exists in an upper portion of the inner heat exchange tube 24. On the contrary, if the inner heat exchange tube 24 is too long compared to the outer heat exchange tube 22, NG is liable not to be sufficiently heated in an upper portion of the outer heat exchange tube 22 where the inner heat exchange tube 24 does not extend. For this reason, the length of the inner heat exchange tube 24 and the flow area of the annular passage 23 are set at such a value that the vaporization of LNG can be completed at the vicinity of the upper end of the inner heat exchange tube 24. Accordingly, the prevention of ice formation and sufficient heating of NG can be realized in a simplified construction.

Experiment Data

FIGS. 6 to 15 are graphs showing a change of temperature of each fluid and thickness of ice formed on the outside surface of the outer heat exchange tube over the length of heat exchange tube when the space distance δ of the annular passage 23 is varied. These graphs are formed based on data of simulation experiments. Specifically, in FIGS. 6 to 10, the ratio of the length of the inner heat exchange tube 24 to the outer heat exchange tube 22 is 50:100, whereas in FIGS. 11 to 15, the ratio is 40:100. It should be noted that LNG at 222 kg/h in FIG. 6 means that the total flow rate of LNG is 222 kilograms per hour, while LNG at 184.5 37.5 in the same graph means that the flow rate of LNG flowing into the inner heat exchange tube 22 is 184.5 kilograms per hour and the flow rate of LNG flowing into the annular passage 23 is 37.5 kilogram per hour. The entire length of the outer heat exchange tube 22 is 10 meters.

Figure 6:
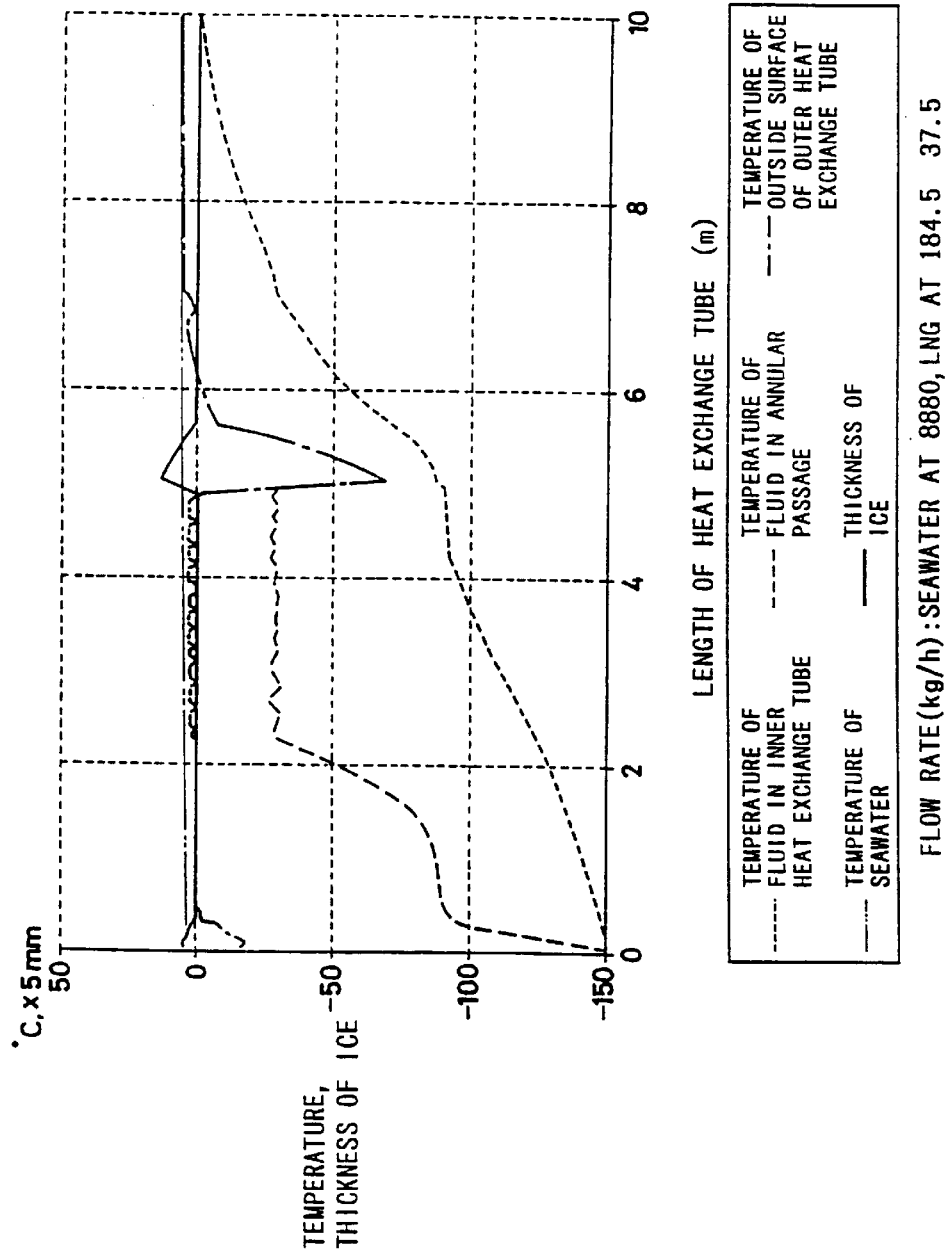
FIGS. 6 to 15 are graphs showing a relationship between a change of temperature and ice thickness over the length of a heat exchange tube under specified conditions.
Figure 7:
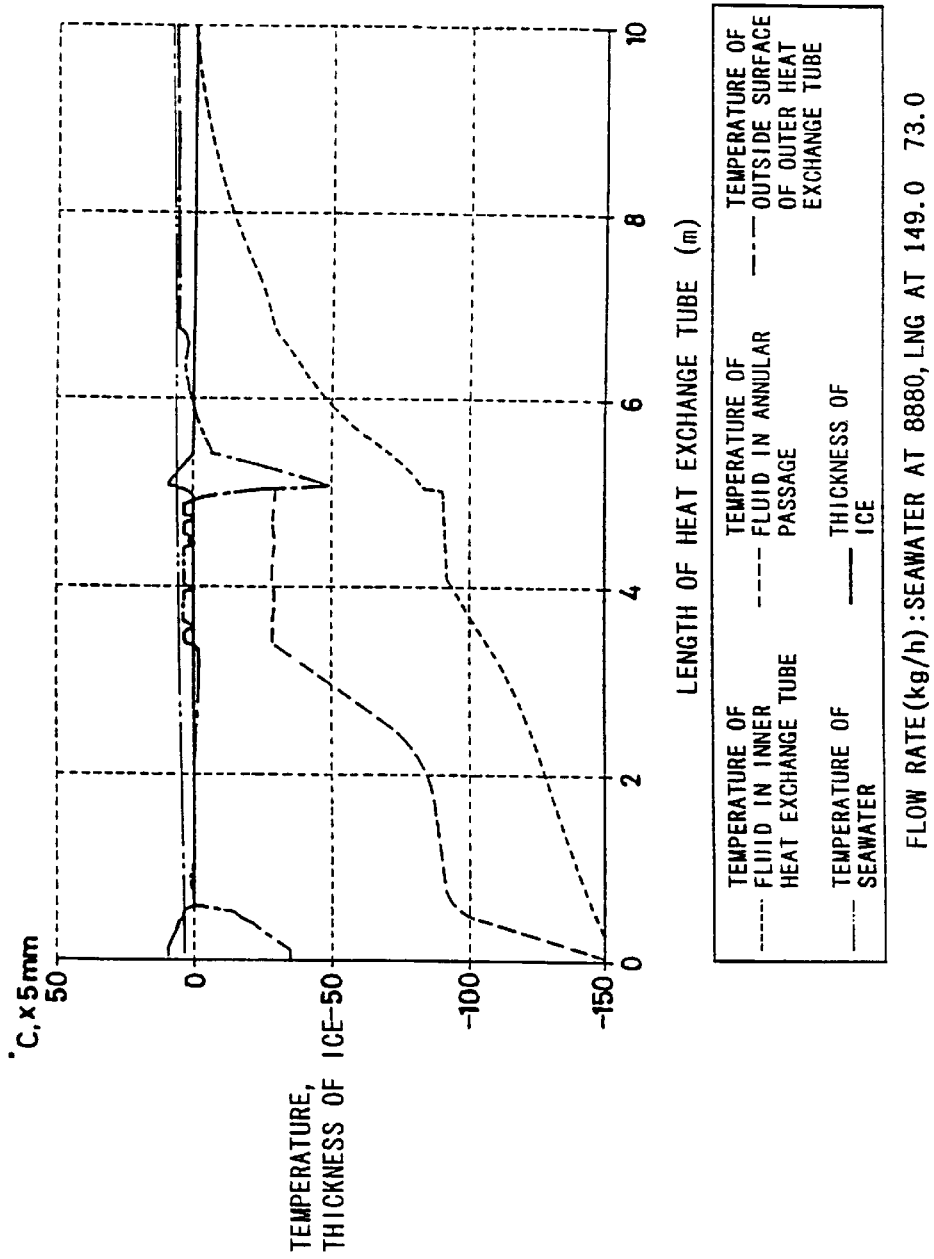

It can be clearly seen in FIG. 6 (wherein a space distance δ of 1.0 mm) and FIG. 7 (wherein a space distance δ of 1.5 mm) that ice formation is remarkable in the intermediate portion of the outer heat exchange tube 22, with the result that the outer wall surface temperature of the outer heat exchange tube 22 at this intermediate portion is locally and remarkably lowered. This can be explained as follows: The space distance δ of the annular passage 23 is small, and thus reduced is the flow rate of LNG flowing in the annular passage 23; The LNG flowing in the annular passage 23 was vaporized in a lower portion or in an intermediate portion of the annular passage 23; Accordingly, the enhanced heat transfer was not attained that is provided by the forced convection boiling which occurs under the co-existing state of gaseous phase and liquid phase; The LNG flowing in the inner heat exchange tube 24 was flowed out from the inner heat exchange tube 24 without being vaporized.

Figure 8:
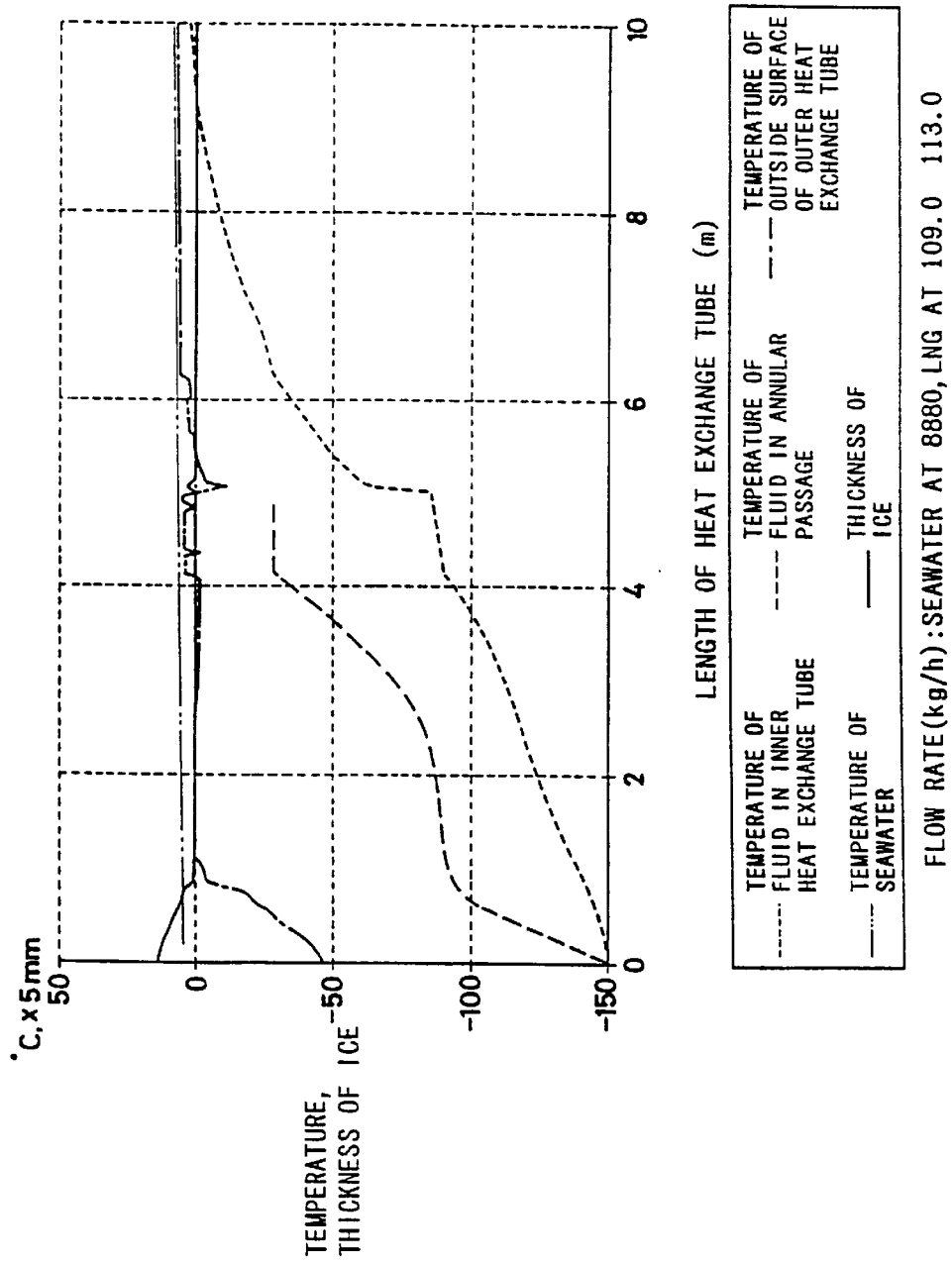
Figure 9:
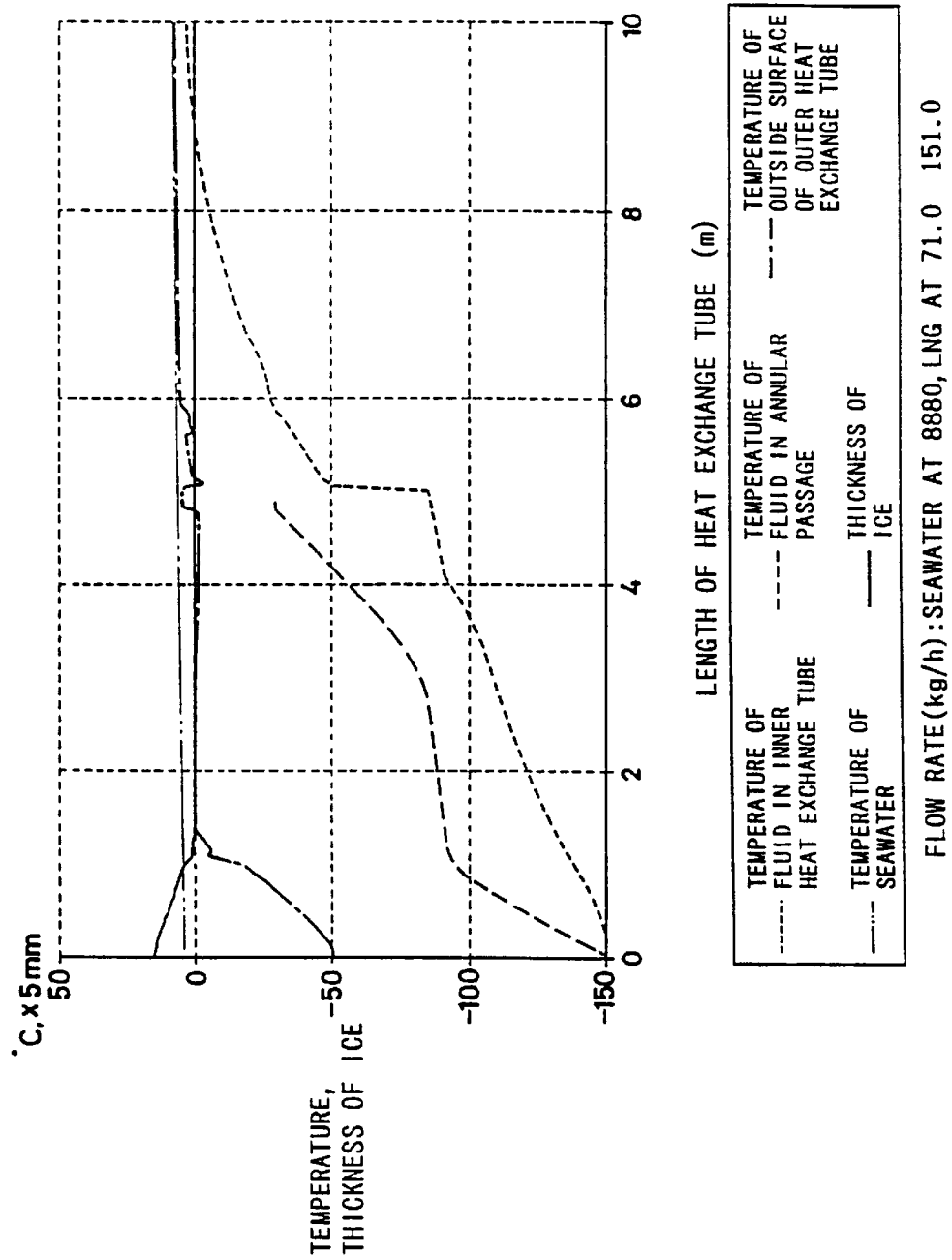
Figure 10:
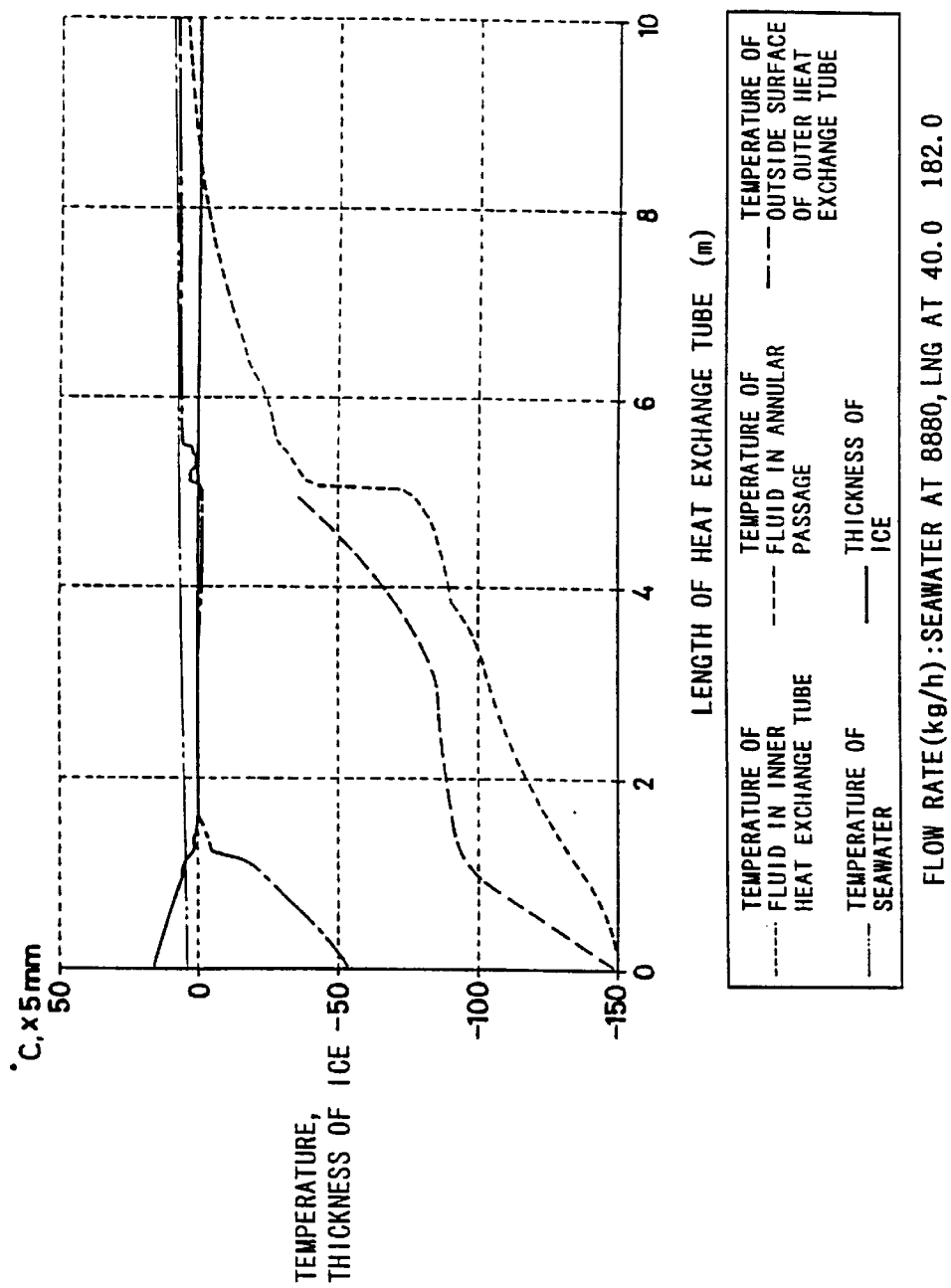
Figure 11:
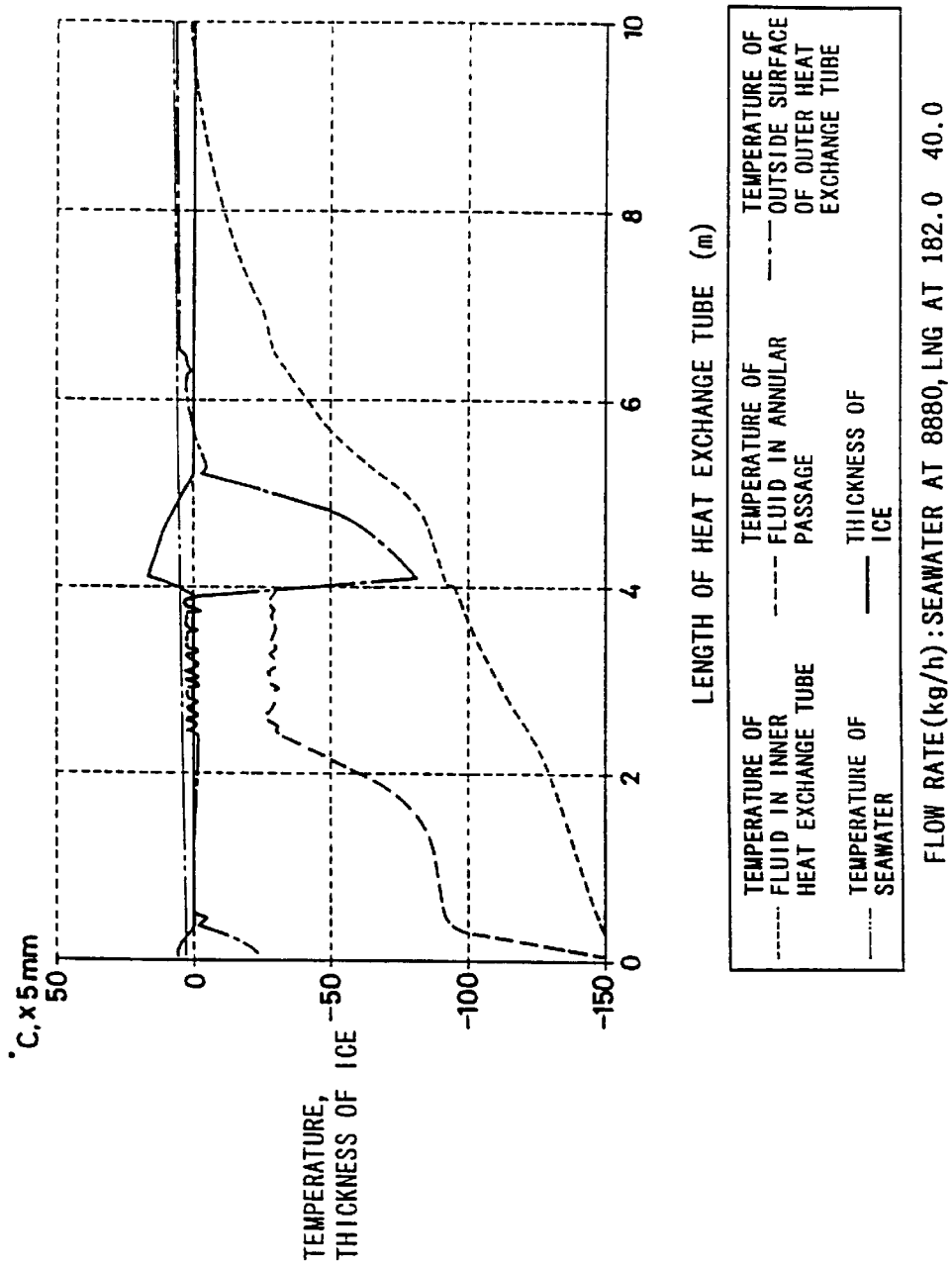
Figure 12:
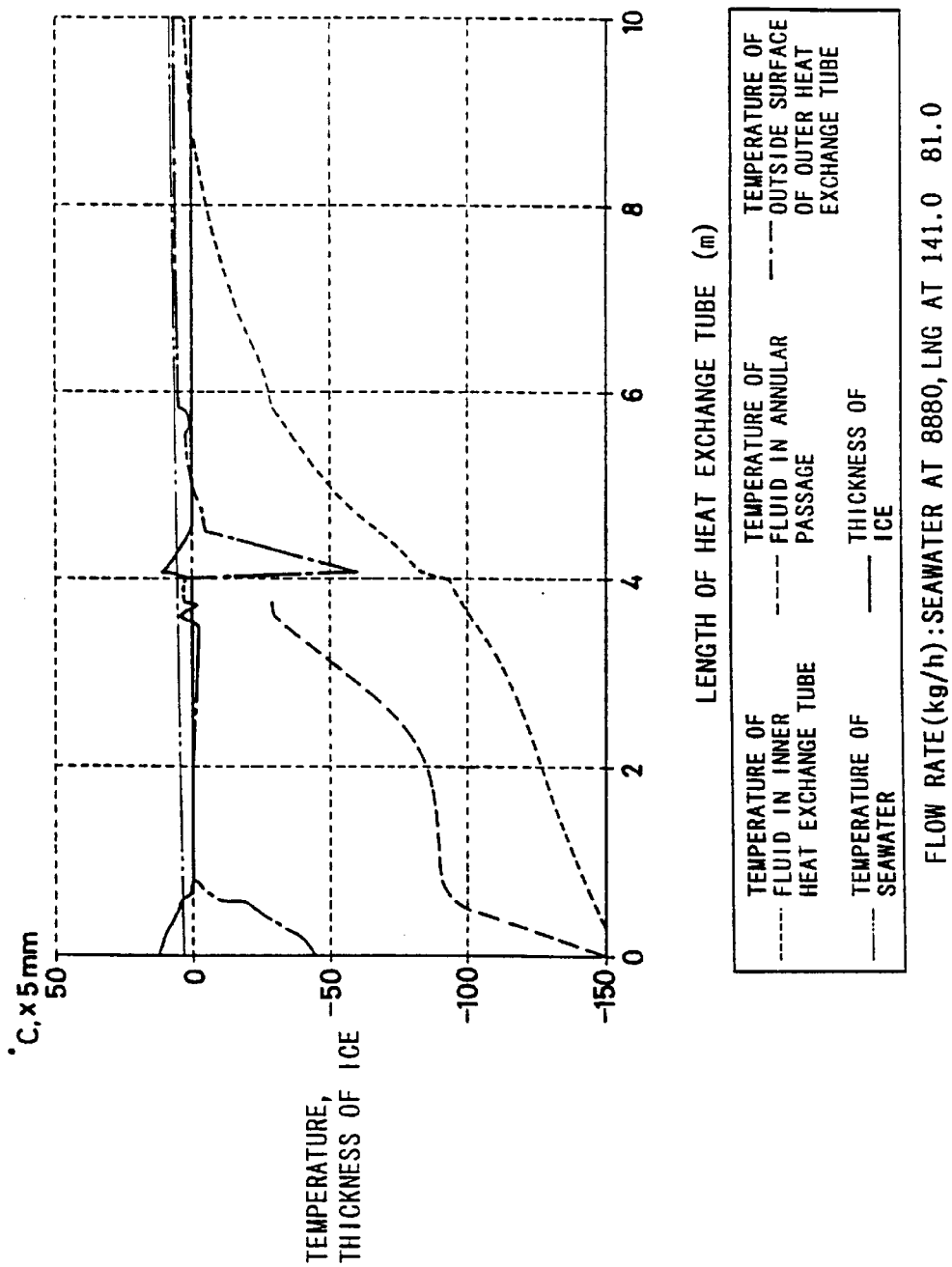
Figure 13:
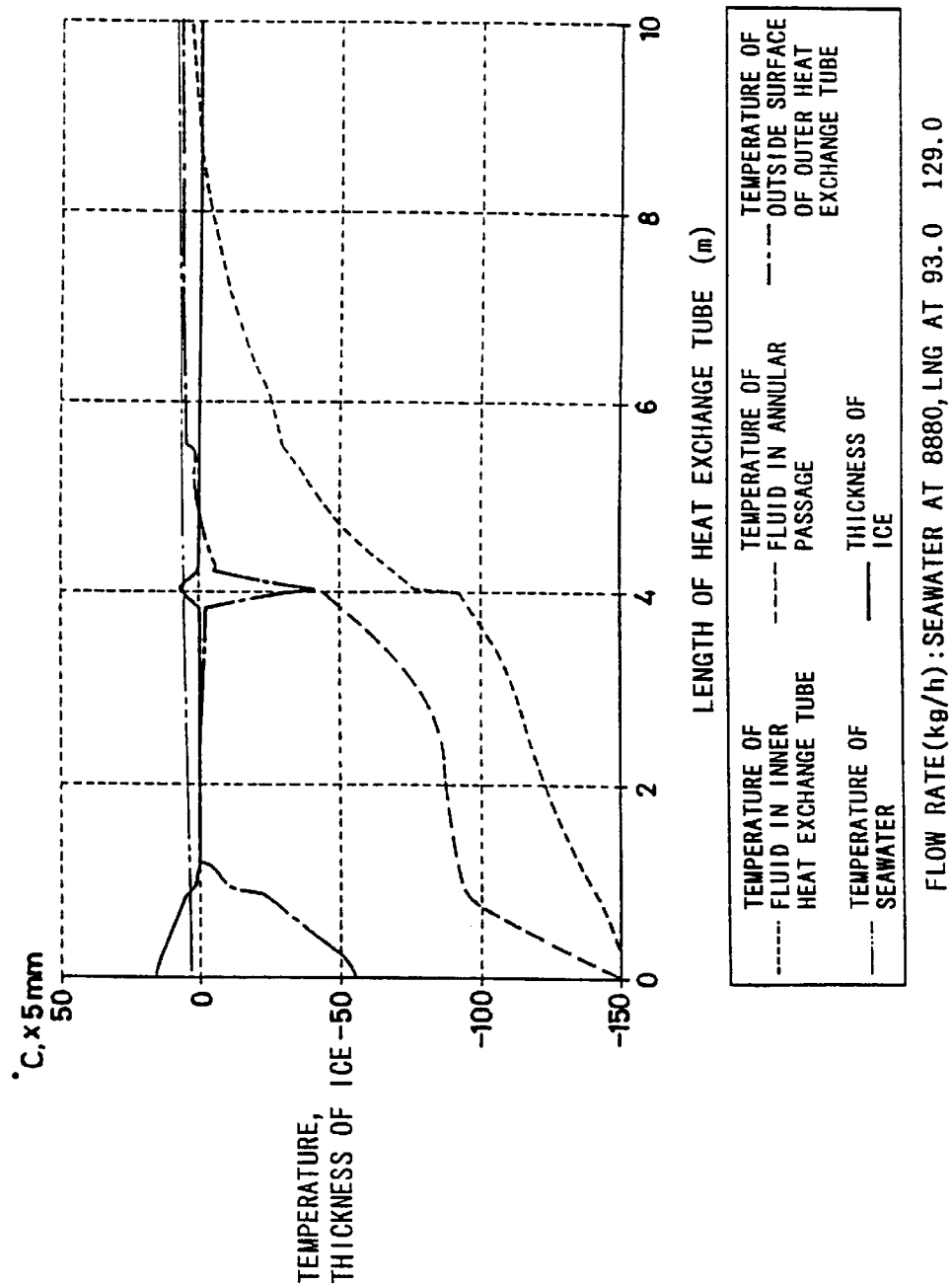
Figure 14:
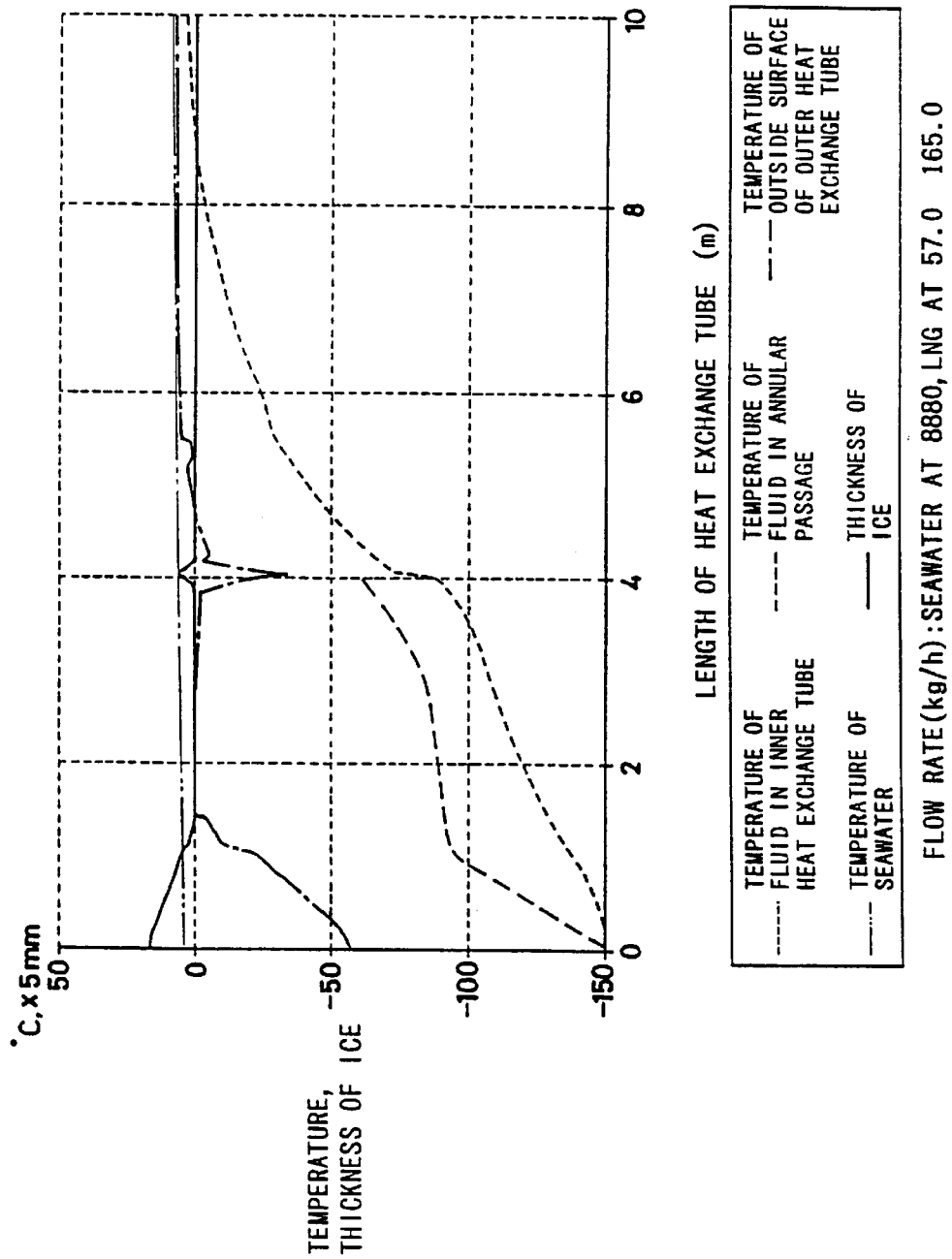
Figure 15:
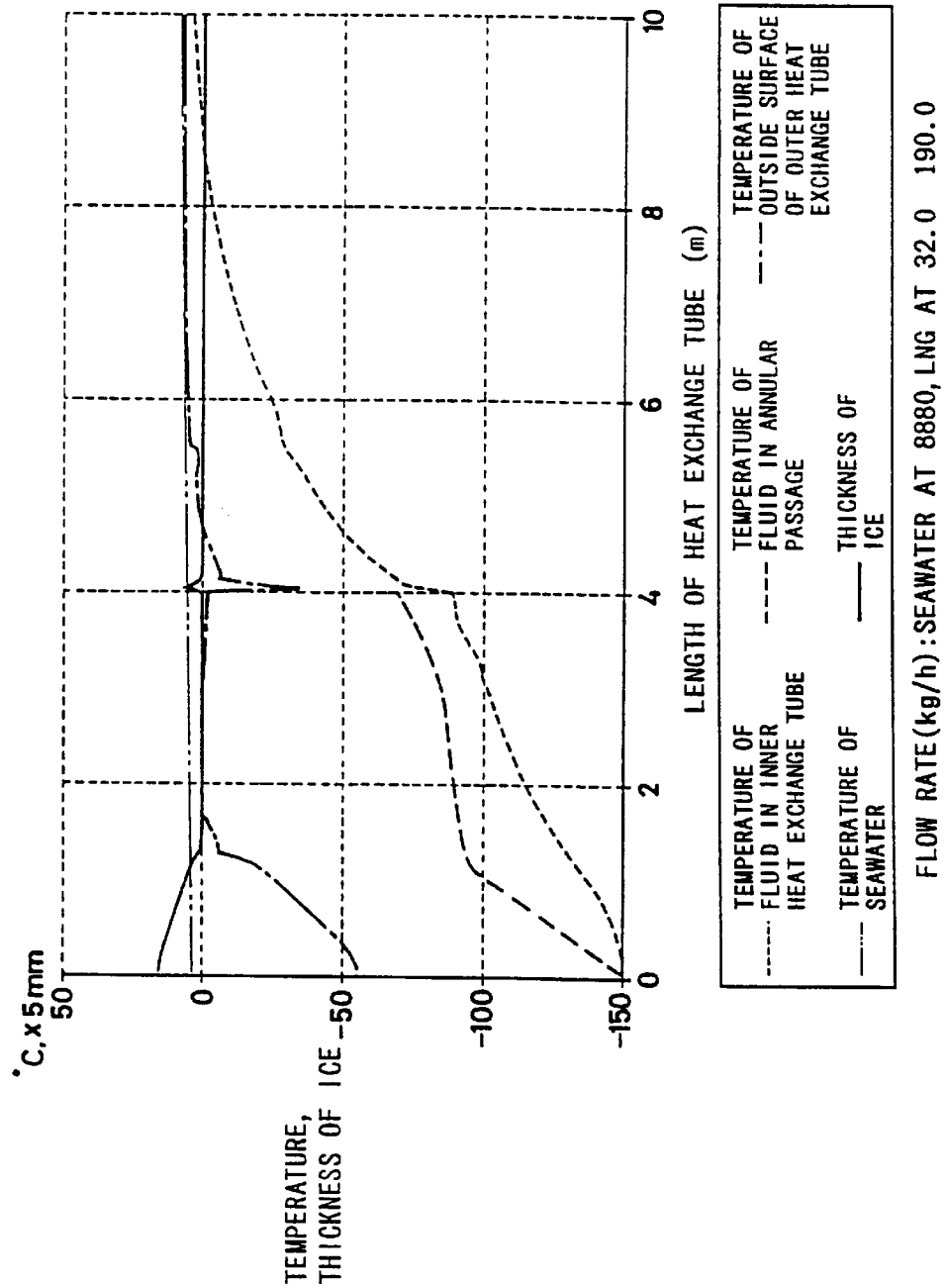

On the other hand, as can be clearly seen in FIG. 8 (wherein a space distance δ (of 2.0 mm), FIG. 9 (wherein a space distance δ of 2.5 mm), and FIG. 10 (wherein a space distance δ of 3.0 mm) that ice formation negligibly occurred in an intermediate portion of the outer heat exchange tube 22, and no local reduction in outside wall surface temperature of the outer heat exchange tube 22 occurred. This can be explained as follows: A large space distance δ enabled the co-existing of liquid phase and gaseous phase in the annular passage 23 which causes the forced convection boiling; The forced convection boiling increased the heat transfer rate of the annular passage 23; Even in the case that some of the LNG flowing in the inner heat exchange tube 24 was not completely vaporized and flowed out from the inner heat exchange tube 24 still in the state of liquid, NG produced by complete vaporization of the LNG flowing in the annular passage 23 enclosed such escaped LNG. As can be seen from FIGS. 8 to 10, according to this invention, the sufficient heat transfer rate can be ensured even if the space distance δ produced in the annular passage 23 is varied in a relatively wide range, which can consequently prevent ice formation.

In the case of FIGS. 11 to 15 where the ratio of the length of the inner heat exchange tube to the outer heat exchange tube is 40:100, similarly, the temperature of the LNG flowing in the inner heat exchange tube 24 cannot be sufficiently raised in the region where the space distance δ is small because the flow rate of the LNG flowing in the inner heat exchange tube 24 is great and the heat transfer area is small. Further, ice formation is remarkably increased around a temperature region where enthalpy abruptly changes, i.e., a region where latent heat for vaporization is absorbed in the case of single component such as water, as shown in FIG. 5. However, the ice formation can be suppressed by widening the space distance δ to increase the flow rate of LNG flowing in the annular passage 23, in other words, reducing the flow rate of LNG flowing in the inner heat exchange tube 24.

Figure 4C:
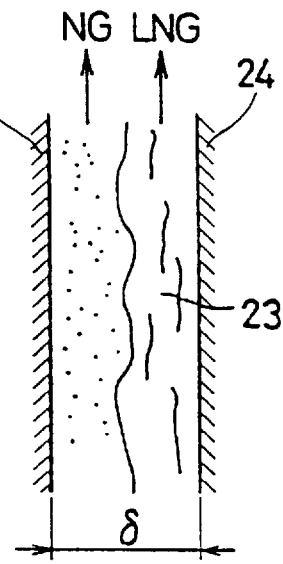

Although data for the case that the space distance δ is further increased were not obtained, it can be predicted that the heat transfer rate lowers in the case of the space distance δ being too large. This is because of the fact that a too-large space distance causes a whole separation of an LNG layer and an NG layer in the annular passage 23 as shown in FIG. 4(c), consequently making it difficult to produce the forced convection boiling in the co-existing state of liquid phrase and gas phrase which increases the heat transfer rate.

Accordingly, in this invention, the length of the inner heat exchange tube 24 and the space distance δ of the annular passage 23 are respectively set at such values that the enthalpy of LNG flowing in the annular passage 23 gently changes around the vicinity of the upper end of the inner heat exchange tube 24, e.g., the enthalpy change at point P in FIG. 5, under an operation pressure of LNG. In this way, ice formation can be reliably prevented with keeping the length of the tube as short as possible.

Figure 16:
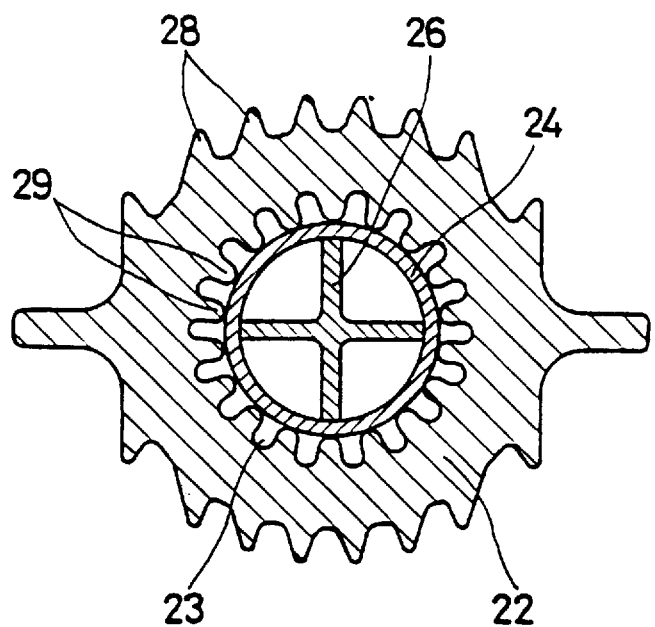
FIG. 16 is a cross sectional view showing an essential part of a liquefied natural gas vaporizer as a second embodiment according to this invention.

Next, a second embodiment of the invention will be described with reference to FIG. 16.

In this embodiment, a plurality of fins 29 in the form of wave-like projections are formed on an inside surface of an outer heat exchange tube 22, instead of the ribs 25 in the first embodiment. A lead end of the fin 29 comes into contact with an outside surface of an inner heat exchange tube 24. In this state, the inner heat exchange tube 24 is placed in the outer heat exchange tube 22.

The fin 29 which serves as a projection for positioning the inner heat exchange tube 24 in the outer heat exchange tube 22 are formed on the inside surface of the outer heat exchange tube 22. Consequently, the surface area of the outer heat exchange tube 22 defining an annular passage 23 is remarkably increased, which thus raises the heat transfer rate from the outer heat exchange tube 22 to the annular passage 23. Accordingly, the space distance of the annular passage 23 can be made further wider, and the precision tolerance for the space distance can be increased.

Next, a third embodiment of the invention will be described with reference to FIGS. 17 to 25.

Figure 17:
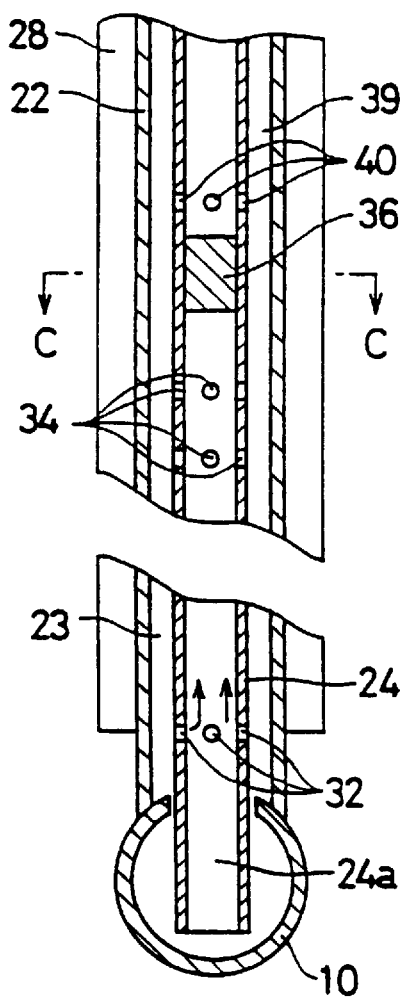
FIG. 17 is a front view in cross section showing an essential part of a heat exchange tube of a liquefied natural gas vaporizer as a third embodiment according to this invention.
Figure 21:
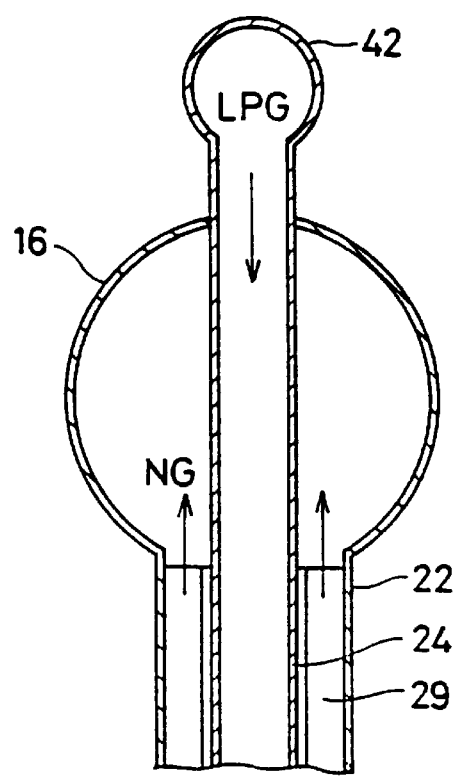
FIG. 21 is a front view in cross section showing an upper portion of the heat exchange tube.
Figure 22:
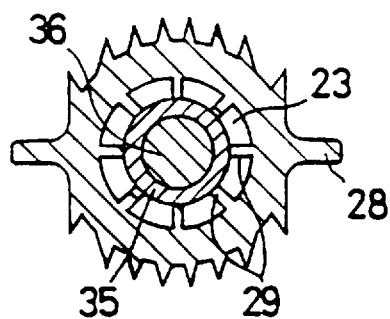
FIG. 22 is a cross sectional view taken along the line C—C in FIG. 17.

In this embodiment, as shown in FIG. 17, an inner heat exchange tube 24 is longer than an outer heat exchange tube 22 in such a manner that a lower end portion 24a of the inner heat exchange tube 24 protrudes in a lower header 10. The inner heat exchange tube 24 is formed with inflow through holes 32 slightly above the lower end portion 24a. The inflow holes 32 are cut through a wall of the inner heat exchange tube 24. The inflow hole 32 is adapted for ejecting LNG from the inside of the inner heat exchange tube 24 into an annular passage 23. As shown in FIG. 21, an upper end portion of the inner heat exchange tube 24 goes through an upper header 16 by a specified distance. In this state, the upper end portion of the inner heat exchange tube 24 is fixedly connected with the upper header 16 in a hung state. An outflow end of the inner heat exchange tube 24 communicates with an LPG supply header 42 in which a heat adjusting fluid is flowed. In this embodiment, liquefied petroleum gas (hereinafter, referred to as "LPG") is flowed.

Figure 18:
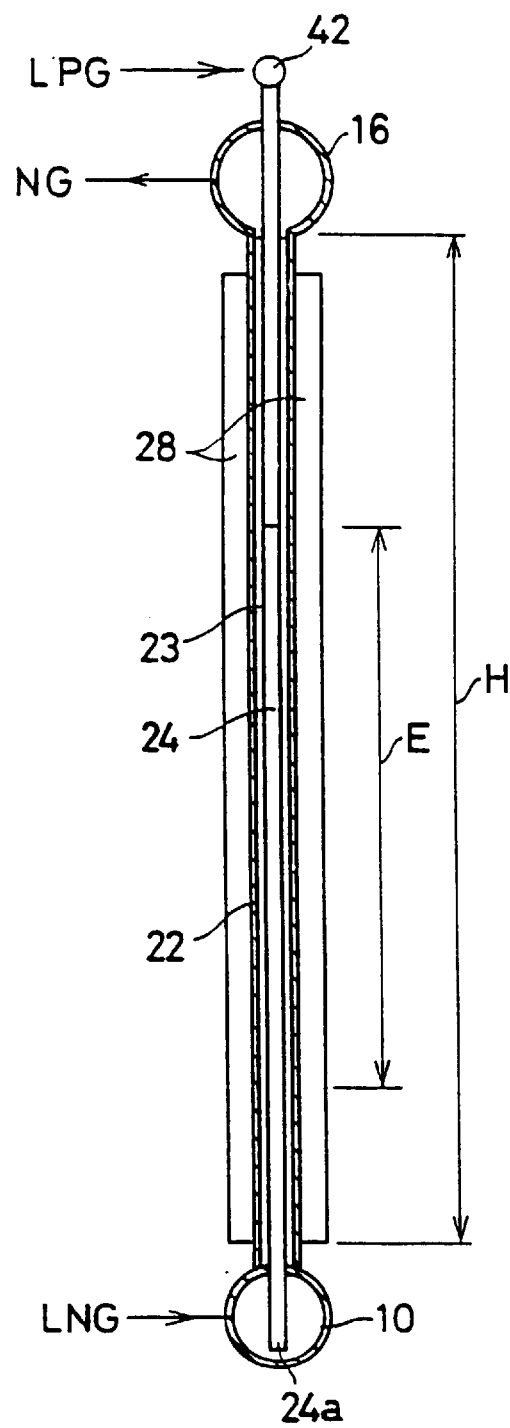
FIG. 18 is a front view in cross section showing an overall construction of the heat exchange tube of the third vaporizer.
Figure 23:
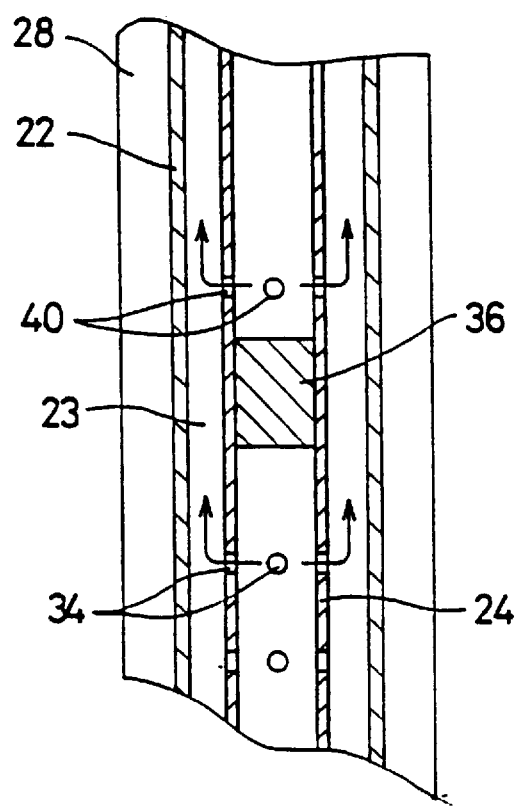
FIG. 23 is an enlarged cross sectional view showing a portion of a heat exchange tube where a closing member is provided.
Figure 24:
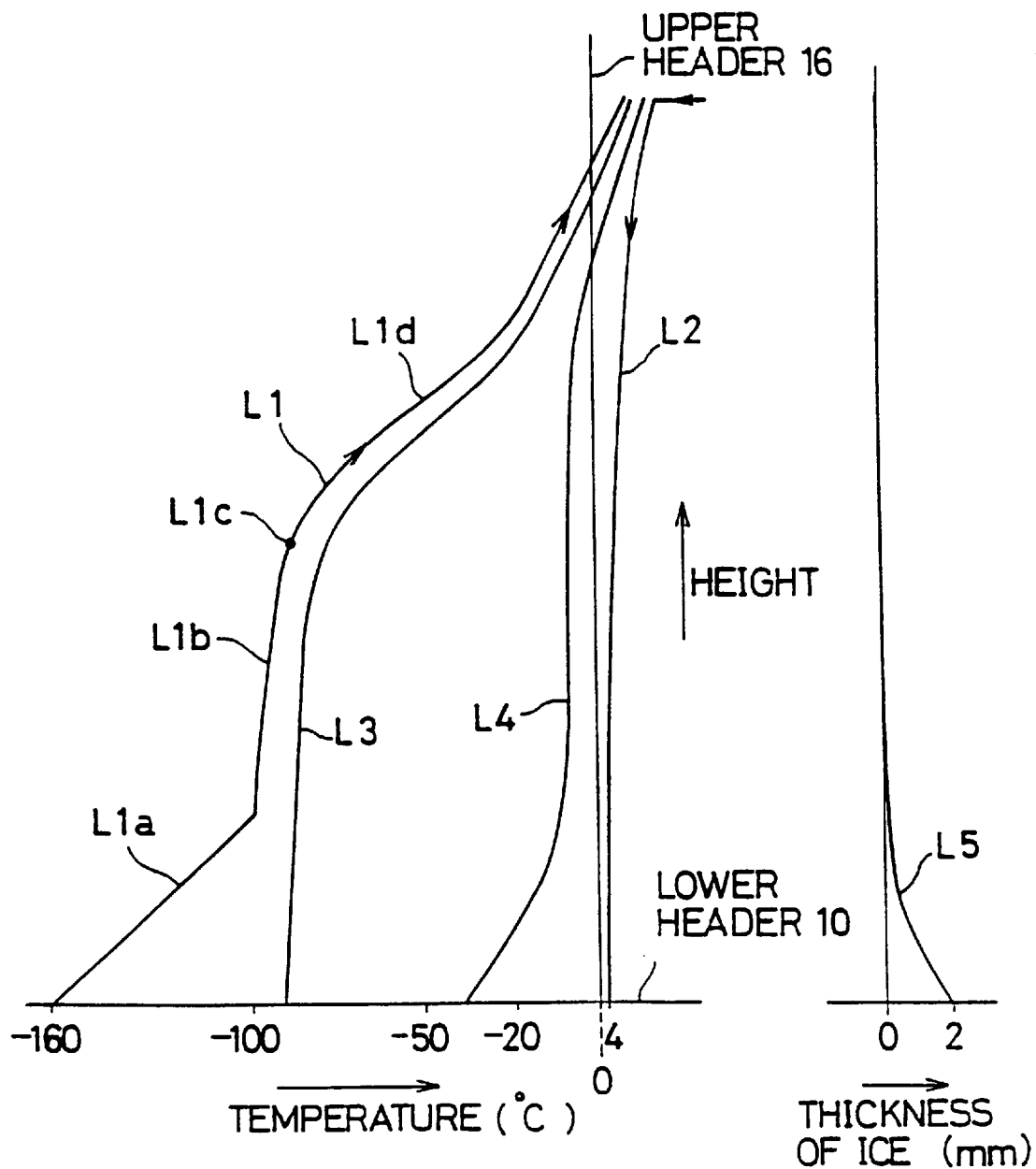
FIG. 24 is a graph showing a performance of a heat exchange tube.
Figure 25:
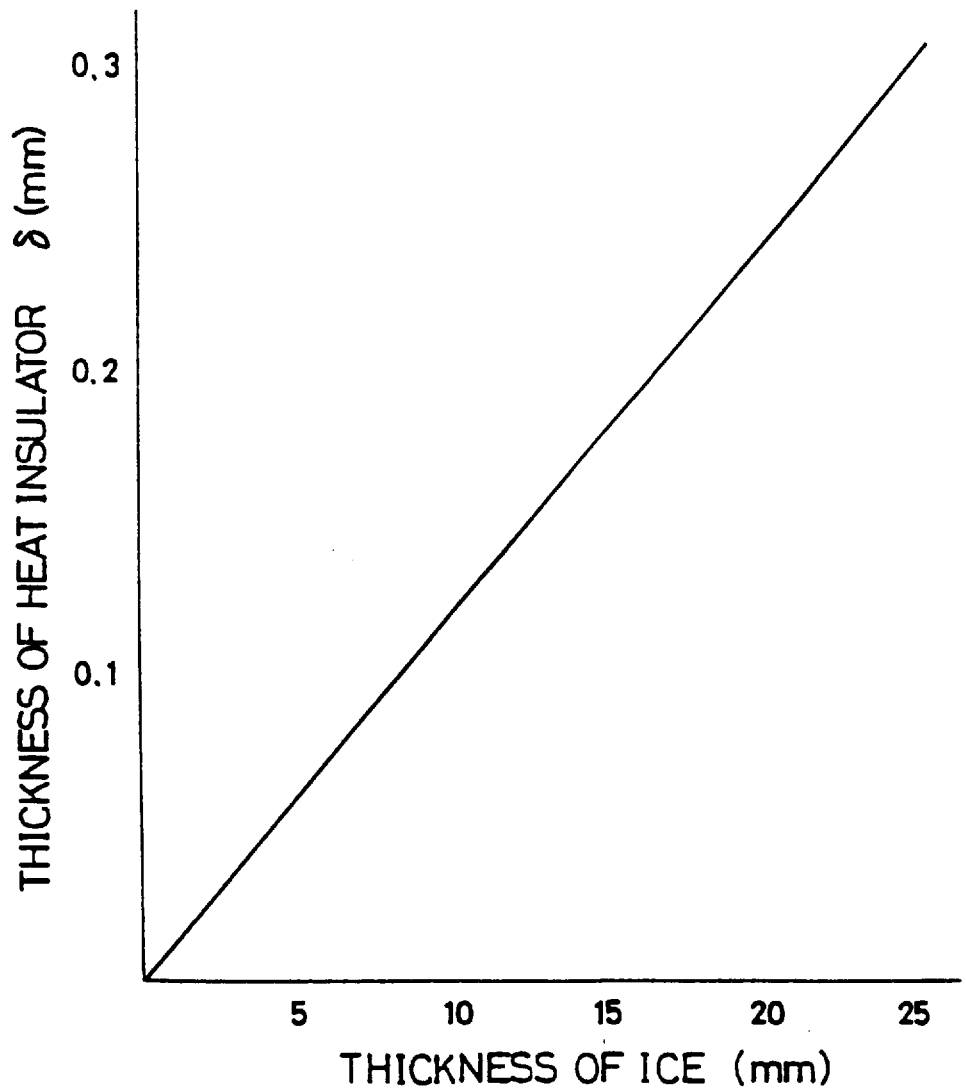
FIG. 25 is a graph showing a relationship between a thickness of heat insulator of a conventional liquefied natural gas vaporizer and an equivalent thickness of ice.

As shown in FIGS. 17 and 23, the inner heat exchange tube 24 is formed with a plurality of ejection holes 34 in an intermediate portion thereof (an area E in FIG. 18). The ejection holes 34 are preferably vertically arranged apart by equidistance and cut through the wall of the inner heat exchange tube 24. The inner heat exchange tube 24 is further provided with a closing member 36 right above an uppermost ejection hole to close the inner heat exchange tube 24. The inner heat exchange tube 24 is further formed with a plurality of mixing holes 40 starting from right above the closing member 36. The mixing hole 40 is similarly cut through the wall of the inner heat exchange tube 24.

Figure 19:
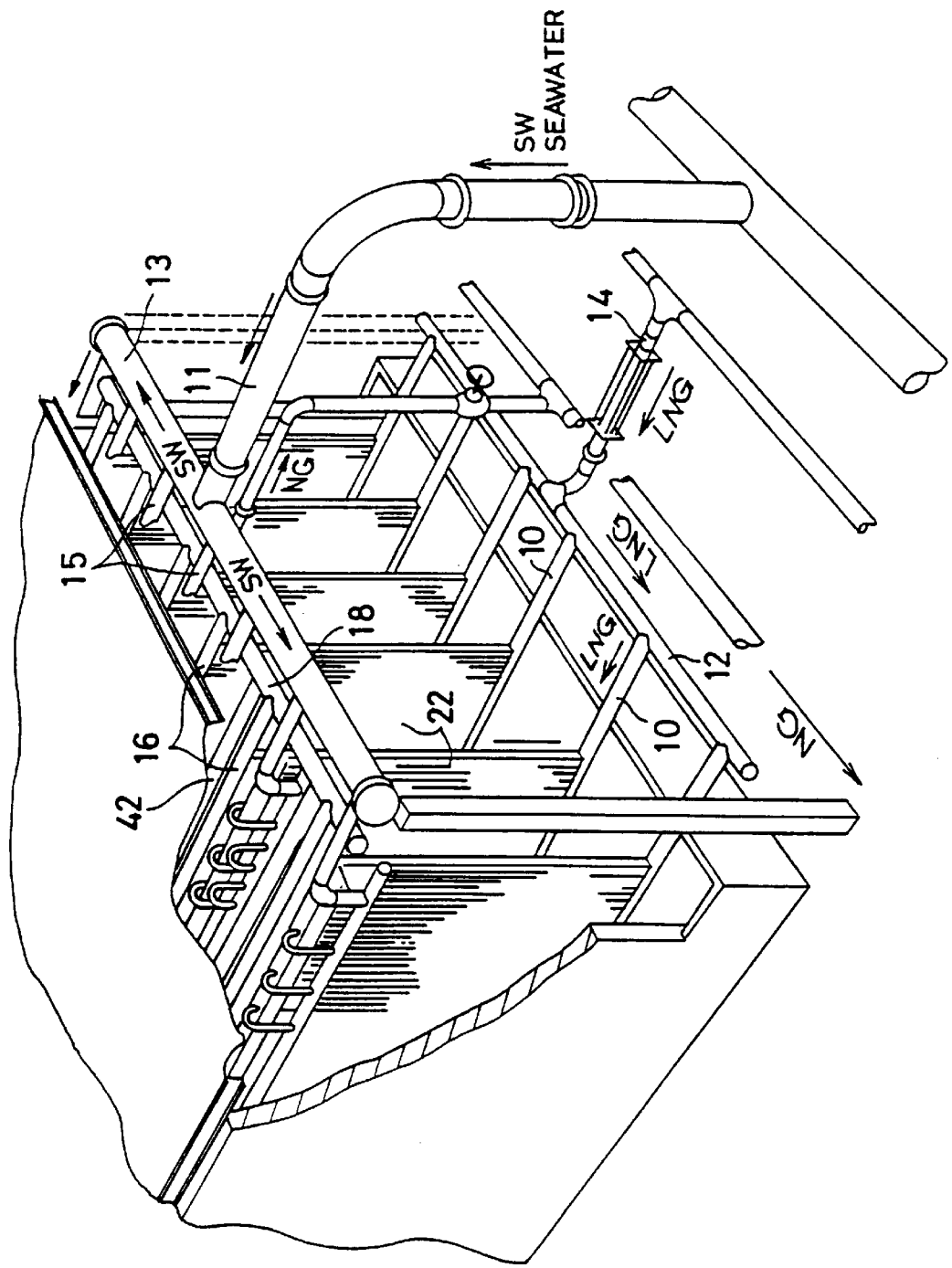
FIG. 19 is a perspective view showing an overall construction of the third vaporizer.
Figure 20:
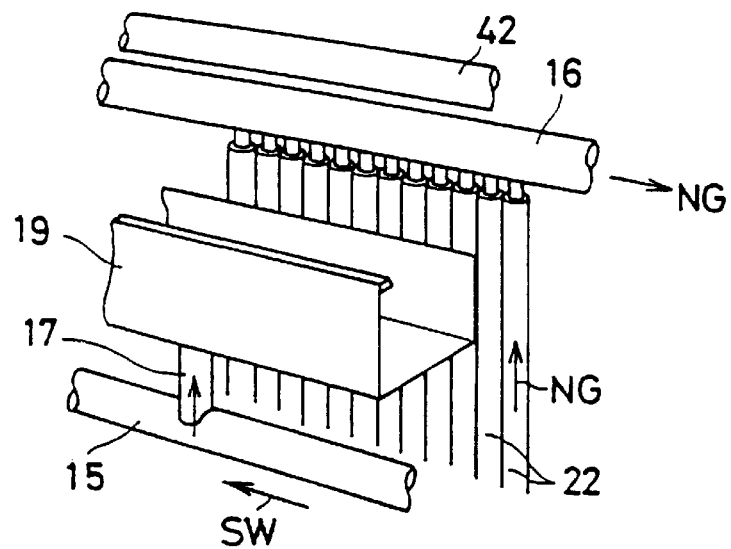
FIG. 20 is a perspective view showing an arrangement of an upper portion of a heat exchange tube panel of the third vaporizer.

As shown in FIG. 19, seawater as heating medium is supplied through a pipe 11 into a seawater manifold 13 from where seawater is branched out and distributed to respective seawater headers 15. The seawater supplied into the seawater header 15 is, as shown in FIG. 20, flowed into a trough 19 having a generally U-shape in cross section by way of a pipe 17. The seawater flown into the trough 19 overflows from the trough 19 and falls down along an outside surface of the plurality of outer heat exchange tubes 22. It should be noted that the seawater supply system having the above structure is applicable to the first and second embodiments.

An operation of the vaporizer as the third embodiment will be described next.

LNG supplied into the lower header 10 is flown into the inner heat exchange tube 24 through the lower end portion 24a. Since the lower end portion 24a protrudes inside the lower header 10, heavy components contained in the LNG are not left in the lower header 10 as residue in a condensed state, even in the case where the load of LNG inside the lower header 10 is small, i.e., the flow rate of LNG is small.

The LNG flowed in the inner heat exchange tube 24 is blocked by the closing member 36 and ejected into the annular passage 23 through the ejection holes 34 or through the inflow holes 32 both of which are located below the closing member 36. The LNG ejected in the annular passage 23 is effectively mixed with NG already produced in the annular passage 23. At this time, even if the LNG undergoes boiling in the inner heat exchange tube 24, a film of NG exists on an inside surface of the inner heat exchange tube 24. However, the ejection will take the NG into the annular passage 23.

On the other hand, LPG flown into the LPG supply header 42 flows down inside an upper portion of the inner heat exchange tube 24, and is blocked by the closing member 36 and ejected into the annular passage 23 through the mixing holes 40 which are located above the closing member 36. Consequently, the ejected LPG is effectively mixed with the NG in the annular passage 23.

FIG. 24(a) is a diagram showing a relationship between temperature and height of the outer heat exchange tube 22. In the diagram: the line L1 indicates an average temperature distribution of a mixture fluid of LNG rising up in the outer heat exchange tube 22 and LPG; the line L2 indicates a temperature distribution of seawater; the line L3 indicates a temperature distribution of the inner heat exchange tube 24; and the line L4 indicates a temperature distribution of the outer heat exchange tube 22.

As can be seen from the diagram, LNG having a specified pressure (e.g., 30 kgG/cm$^2$) and a temperature of about −160° C. is flown from the lower header 10. As represented by the line L1a, the LNG flown from the lower header 10 is heated by the heat exchange with the seawater as heating medium as rising in the inner heat exchange tube 24 and the annular passage 23, and the temperature of the LNG consequently increases. Subsequently, as represented by the line L1b, the LNG starts the vaporization at about −90° C., and completes the vaporization at the point L1c.

As represented by the line L1d, the temperature of the LNG further increases. When the temperature of the LNG becomes about −100° C., LNG is ejected from the inner heat exchange tube 24 into the annular passage 23 through the ejection holes 34, and is mixed with a mixture fluid of LNG and NG in the annular passage 23, and is further mixed with LPG ejected from the mixing holes 40. At this mixing point, the temperature of the LNG is about −20° C. Accordingly, even if impurity matters having a high solidifying point, e.g., methanol (whose solidifying point is about −125 C.), are contained in the LPG, such impurity matters (methanol) will not solidify, which accordingly eliminates the problem that a passage is closed due to a solidification.

It should be noted that the temperature of seawater supplied from the trough 19 is about 10° C. and that the temperature of NG in the upper header 16 is about 8° C.

The line L5 in FIG. 24(b) shows a change in the thickness of ice formed on an outside surface of the outer heat exchange tube 22. The thickness of ice is no greater than about 2 mm even at a lowermost portion of the outer heat exchange tube 22. This thickness is negligible and will not adversely affect the heat transfer rate.

The entire length H of the outer heat exchange tube 22 shown in FIG. 18 may be set as long as e.g., 10 meters. In FIG. 18, the upper header 16 and the lower header 10 are supported by a support frame and the outer heat exchange tube 22 and the inner heat exchange tube 24 are supported in the hung state. The lower end portion 24a of the inner heat exchange tube 24 is a free end. Also, a lower end portion of the outer heat exchange tube 22 is not held in a fixed state. Accordingly, there is not the likelihood that the heat exchange tubes 22 and 24 receive a great thermal stress due to thermal contraction.

The present invention is not limited to the above-mentioned vaporizer, and other constructions can be used as follows:

According to this invention, the flowing direction of LNG in an outer heat exchange tube is not limited. For example, the upper header may serve as an inflow port, and the lower header may serve as an outflow port, which is opposite to the arrangement of the foregoing embodiments. In this case, lower temperature liquid such as LNG is forcibly flowed down from the upper header through the heat exchange tubes to the lower header utilizing the weight. Alternatively, the inflow header and the outflow header may be arranged in the same horizontal plane and connected with each other by way of outer heat exchange tubes lying in the same horizontal plane.

In the first and second embodiments, the length difference between the outer heat exchange tube 22 and the inner heat exchange tube 24, i.e., a length distance corresponding to a region where the inner heat exchange tube 24 is not provided in the outer heat exchange tube 22, may be set in accordance with a target temperature of NG in the outflow header. Specifically, the higher the target temperature is, the longer the length difference is made to enable NG to be heated for a longer period.

According to this invention, it may be appreciated to provide a sparger tube having a plurality of through holes in an inflow header 10. LNG is flown into the sparger tube. This construction is advantageous in supplying LNG in the inflow header 10 more uniformly.

EXPLOITATION IN INDUSTRY

As mentioned above, in this invention, an outer heat exchange tube for communicating with an inflow header and an outflow header is internally arranged with an inner heat exchange tube in an inflow portion thereof. An annular passage for flowing a low temperature liquid is defined between the inner heat exchange tube and the outer heat exchange tube. The annular passage communicates with the inflow header. Accordingly, an axial flow of fluid in the annular passage and a co-existing of liquid phase and gaseous phase enhance forced convection boiling in the annular passage, thereby increasing the heat transfer rate. Hence, compared to the conventional vaporizer provided with the heat insulating space for merely containing gas, the space distance of the annular passage can be made wider. Accordingly, it is possible to increase the dimensional tolerance of the space distance which assures sufficient heat transfer and prevent ice formation on an outside surface of outer heat exchange tube. Thus, the production of a low temperature liquid vaporizer can be simplified and the production cost can be reduced.

We claim:

1. A low temperature liquid vaporizer comprising: an inflow header for flowing low temperature liquid; a plurality of outer heat exchange tubes communicated with the inflow header, each outer heat exchange tube extending in a direction perpendicular to the inflow header, an outside of the outer heat exchange tubes coming into contact with a heating medium; an outflow header communicated with the inflow header by way of the plurality of outer heat exchange tubes for flowing gas produced be vaporization of the low temperature liquid in the outer heat exchange tubes; a plurality of inner heat exchange tubes provided in at least respective inflow portions of the plurality of outer heat exchange tubes, each inner heat exchange tube forming an annular passage between an inside surface of the corresponding outer heat exchange tube and an outside surface of the inner heat exchange tube, the annular passage communicating with the inflow header and the outflow header for flowing the low temperature liquid.

2. A low temperature liquid vaporizer as defined in claim 1, wherein one of the inside surface of the outer heat exchange tube and the outside surface of the inner heat exchange tube is formed with a plurality of projections, the projections being arranged in a circumferential direction of the tube and projecting toward the other surface, a lead end of each projection coming into contact with the other surface.

3. A low temperature liquid vaporizer as defined in claim 2, wherein the inside surface of the outer heat exchange tube is formed with the projections.

4. A low temperature liquid vaporizer as defined in one of claims 1 to 3, wherein the inner heat exchange tube is shorter than the outer heat exchange tube, and the inner heat exchange tube is disposed in an inflow end portion of the outer heat exchange tube.

5. A low temperature liquid vaporizer as defined in claim 1, wherein an inflow end of the inner heat exchange tube is positioned in the inflow header.

6. A low temperature liquid vaporizer comprising: an inflow header for flowing low temperature liquid; a plurality of outer heat exchange tubes communicated with the inflow header, each outer heat exchange tube extending in a direction perpendicular to the inflow header, an outside of the outer heat exchange tubes coming into contact with a heating medium; an outflow header communicated with the inflow header by way of the plurality of outer heat exchange tubes for flowing gas produced be vaporization of the low temperature liquid in the outer heat exchange tubes; a plurality of inner heat exchange tubes provided in at least respective inflow portions of the plurality of outer heat exchange tubes, each inner heat exchange tube forming an annular passage between an inside surface of the corresponding outer heat exchange tube and an outside surface of the inner heat exchange tube, the annular passage communicating with the inflow header for flowing the low temperature liquid, wherein the inner heat exchange tube is formed with an ejection hole in a wall thereof and provided with a closing member in the inner heat exchange tube at a position closer to the outflow header than the ejection hole.

7. A low temperature liquid vaporizer as defined in claim 6, wherein the outer and inner heat exchange tubes are arranged in a vertical direction while the outflow header is above the inflow header, an upper end of the inner heat exchange tube is fixedly attached to the outflow header, and the outer heat exchange tube and the inner heat exchange tube are supported to the outflow header in a hung state.

8. A low temperature liquid vaporizer as defined in claim 6 or 7, further comprising a secondary header for flowing heat adjusting fluid, wherein an outflow end of the inner heat exchange tube projects from an outflow end of the outer heat exchange tube and is connected with the secondary header, and the inner heat exchange tube is formed with a mixing hole in a wall thereof at a position which is closer to its outflow end than the closing member and not beyond the outflow end of the outer heat exchange tube.

\* \* \* \* \*